(12) United States Patent
Milone

(10) Patent No.: US 7,661,307 B1
(45) Date of Patent: Feb. 16, 2010

(54) LOW MANUFACTURING COST PRINTED INK LIQUID LEVEL SENSORS

(76) Inventor: Christopher J. Milone, 17 Ravenswood Way, Sewell, NJ (US) 08080-3422

( * ) Notice: Subject to any disclaimer, the term of this patent is extended or adjusted under 35 U.S.C. 154(b) by 311 days.

(21) Appl. No.: 11/800,232

(22) Filed: May 4, 2007

(51) Int. Cl.
  *G01F 23/24* (2006.01)
  *G01F 23/00* (2006.01)
(52) U.S. Cl. ............................... 73/304 R; 73/290 R
(58) Field of Classification Search ............... 73/318, 73/321, 290 R, 301, 304 R
  See application file for complete search history.

(56) References Cited

U.S. PATENT DOCUMENTS

| | | | |
|---|---|---|---|
| 3,623,366 A * | 11/1971 | Rowell | 73/301 |
| 4,560,445 A * | 12/1985 | Hoover et al. | 205/126 |
| 4,890,492 A | 1/1990 | Andrejasich | |
| 5,146,785 A * | 9/1992 | Riley | 73/313 |
| 6,262,953 B1 | 7/2001 | Benjey | |
| 6,829,928 B2 | 12/2004 | Milone | |
| 6,959,599 B2 * | 11/2005 | Feldstein et al. | 73/304 R |
| 7,202,859 B1 * | 4/2007 | Speck et al. | 345/174 |
| 2002/0083858 A1 * | 7/2002 | MacDiarmid et al. | 101/484 |
| 2004/0200277 A1 * | 10/2004 | Feldstein et al. | 73/304 R |
| 2006/0238291 A1 * | 10/2006 | Beck et al. | 338/200 |
| 2007/0030111 A1 * | 2/2007 | Beck et al. | 338/35 |
| 2007/0030112 A1 * | 2/2007 | Beck et al. | 338/211 |
| 2007/0132542 A1 * | 6/2007 | Beck et al. | 338/35 |
| 2008/0058744 A1 * | 3/2008 | Tippey et al. | 604/361 |

* cited by examiner

*Primary Examiner*—Hezron Williams
*Assistant Examiner*—Rodney T Frank
(74) *Attorney, Agent, or Firm*—Robert Nathans

(57) ABSTRACT

First and second elongated flexible insulated substrates have patterns of resistive liquid level sensor sections along the substrate lengths, each pattern comprising printable resistive ink of the same resistivity (ohms-squared), wherein the patterns can be simultaneously printed upon each substrate to save manufacturing costs. The substrates can be separated by an elongated spacer that couples longitudinal edges of the facing substrates together with an appropriate adhesive. Alternatively, the facing substrates can be folded along a central fold line to form a first longitudinal edge and adhesively joined along a second longitudinal edge opposite the first longitudinal edge. The flexibility of the substrates enables the low manufacturing cost liquid level sensors to be positioned in for example in a highly irregularly shaped vehicle fuel tank. Also, sections of varying lengths to be cut from the rolls on demand by users to form customized lengths of liquid level sensors for numerous applications.

22 Claims, 3 Drawing Sheets

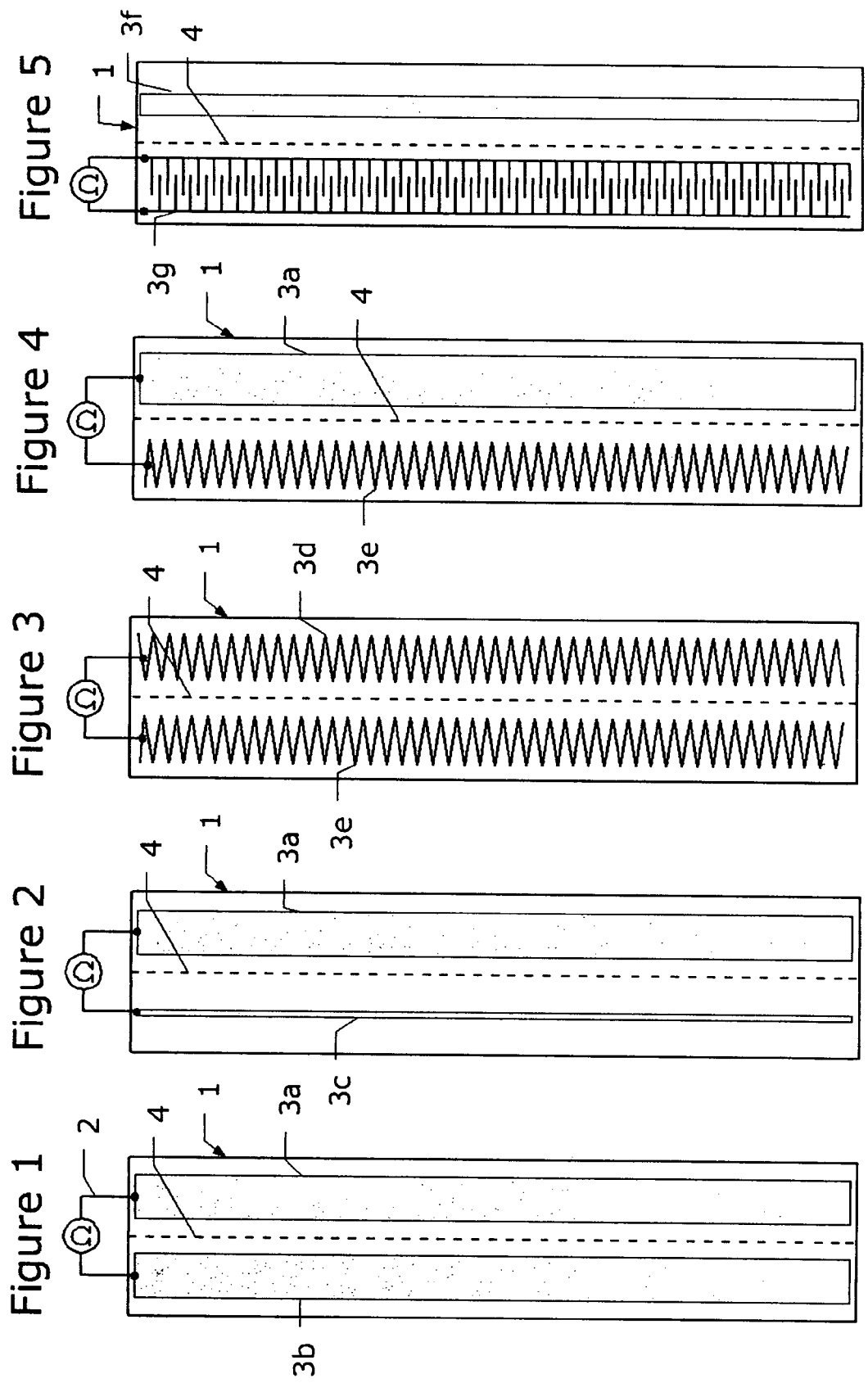

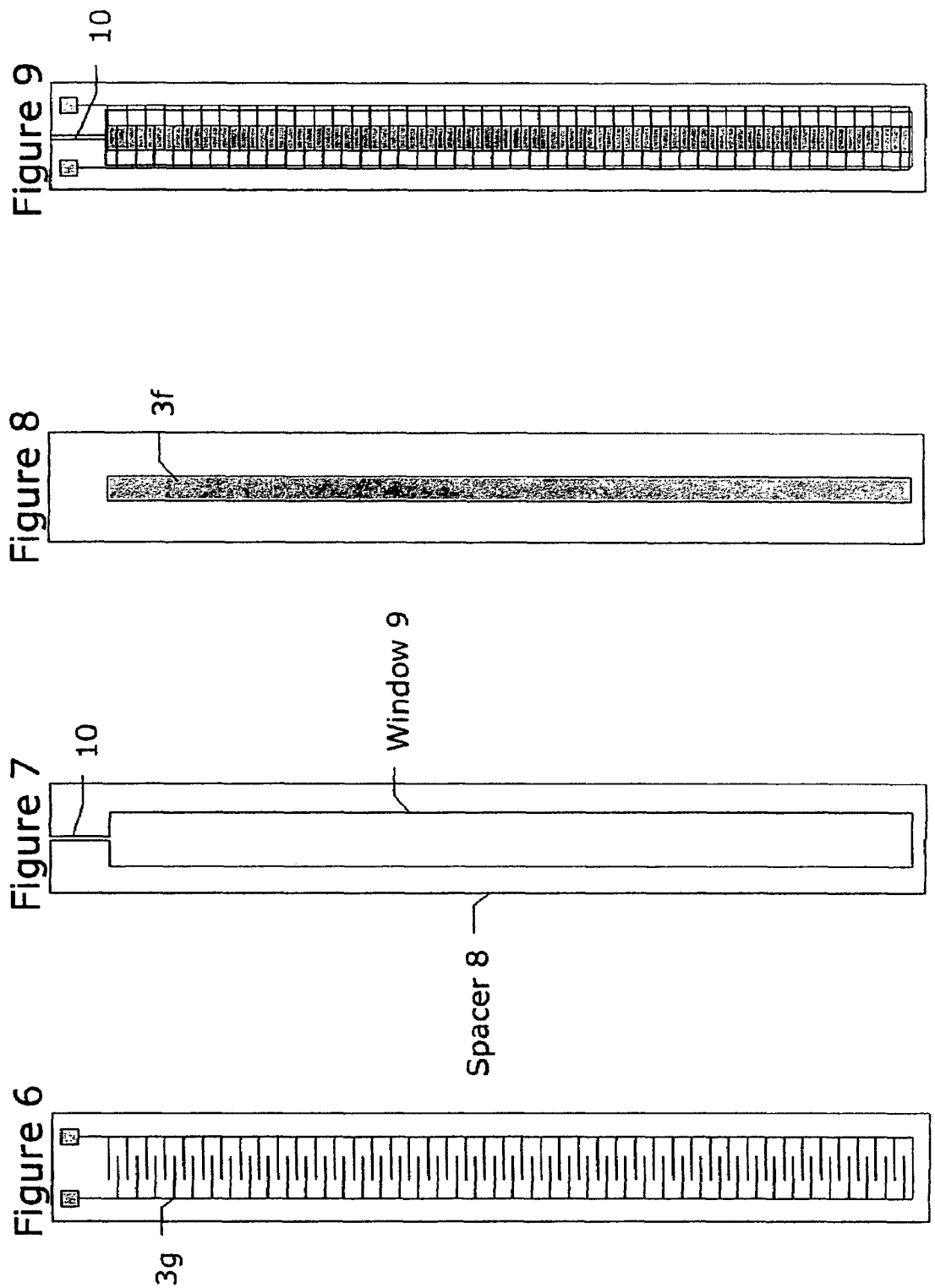

LOW MANUFACTURING COST PRINTED INK LIQUID LEVEL SENSORS

BACKGROUND OF THE INVENTION

A primary application of the invention disclosed herein is for use as an automobile fuel sensor. Automobile fuel gauges are notoriously inaccurate, indicating that the tank is empty when there are several gallons of fuel left and remaining on full for the first 50 miles after filling the tank. They are also prone to mechanical malfunction associated with sticking of the moving parts of the gauge This commonly employed prior art fuel sensor, also known as the fuel sensing unit, is located in the fuel tank and consists of a float connected to a metal rod. The end of the rod is mounted to the "wiper" of a variable resistor. The variable resistor consists of a strip of resistive material connected on one side to the ground. The wiper, which is also connected to the dashboard fuel gauge, slides along the strip of resistive material as the fuel level in the tank changes. In accordance with Ohm's Law, the more resistance there is, the less current will flow and the less resistance there is, the more current will flow. The amount of fuel in the tank correlates with the current flowing through the resistor and fuel gauge. When the tank is full, the float is at the top of the tank and the wiper is near the grounded side of the strip. Therefore, there is little or no resistive material in the path of the current and the current flow is at a maximum. As the fuel level in the tank drops, the float sinks, the wiper moves, the resistance increases and the amount of current flowing through the gauge decreases. When the tank is empty the float is at the bottom of the tank and the wiper is at the far end of the strip. Thus, there is more resistive material in the in the path of the current, and the current flow is at a minimum.

The mechanical float is a primary reason for the inaccuracy of fuel gauges. It is common for fuel gauges to remain on full for quite a while after filling the tank. When the tank is full, the float is at its maximum raised position which is dictated by the connecting rod and/or the top of the tank. This results in the float being submerged, and the float will not drop until the fuel level drops to a position near the bottom of the float. Therefore, the fuel gauge indicator won't start to move until the float starts to drop.

Similar inaccuracies are introduced when the float nears the bottom of the tank. Typically, the range of motion does not extend to the very bottom of the tank and the float can reach the bottom of its travel while there is still fuel in the tank. As a result, the fuel gauge indicates that the tank is empty while there are still several gallons of fuel left in the tank.

In addition, the shape of the fuel tanks themselves can also introduce inaccuracies. Today's fuel tanks are made from plastics, molded to fit into very tight spaces. Fuel tanks are typically shaped to fit around components of the cars body or frame. This means that when the float reaches the halfway point on the tank, there may be more or less than half of the fuel left in the tank, depending on its shape.

Thus, there is a need for a liquid level sensor for replacing the cumbersome inaccurate float apparatus with a sensor that accurately indicates the volume of liquid such as fuel in the fuel tanks and including various vehicles that have widely varying fuel tank shapes and to do so with a liquid level sensor having a much lower manufacturing cost than the aforesaid float apparatus.

Also, in contrast with the manufacture of such discrete probes of limited length, it would also be desirable to provide rolls of long hydrostatic liquid sensor elements that can be cut into customized length sections from the rolls to form sensors to be positioned down deep liquid storage tanks or even deeper groundwater wells for example, without the need to join shorter discrete probes together. The use of such rolls enables on the spot variations of lengths of sensors for immediately fabricating various customized sensors. For example, a tank farm may have tanks of liquid having many various depths and it would be desirable to rapidly and easily provide sensors of varying length under these circumstances.

BRIEF SUMMARY OF PREFERRED EMBODIMENTS OF THE INVENTION

In order to meet these needs, first and second elongated flexible insulated substrates that face each other are provided, having patterns of resistive liquid level sensor sections thereon along the length of the substrates, each pattern comprising a printable resistive ink upon each substrate preferably of the same resistivity (square ohms), and wherein the patterns can be simultaneously printed upon each substrate to save manufacturing costs. The substrates can be separated by an elongated windowed spacer that couple the longitudinal edges of the facing elongated substrates together with an appropriate adhesive upon the spacer. In another embodiment, the facing substrates can be folded along a central fold line to form a first longitudinal edge and adhesively joined along a second longitudinal edge opposite the first longitudinal edge. The flexibility of the substrates enables the low manufacturing cost liquid level sensors to be positioned anywhere, in any orientation for design flexibility in a highly irregularly shaped vehicle fuel tank and yet, by virtue of a simple lookup table microprocessor, can produce accurate readout indications of the amount of remaining fuel in the fuel tank.

Furthermore, long rolls of substantial length of the resulting flexible liquid level sensor material can be provided, to enable sections of varying lengths to be cut from the rolls on demand by users to form customized lengths of liquid level sensors for vessels other than vehicle fuel tanks, such as storage tanks and ground wells having varying depths. This is another beneficial result of the preferred high flexibility of the sensors having printed resistive ink thereon. Other liquid level sensors of the invention, employing the printable resistive ink technique, although not flexible, are less costly to manufacture than the aforesaid discreet fixed length liquid level sensing probes of the prior art.

An additional benefit is to provide a liquid level sensor having an extremely high water level measurement resolution of one hundredths of a foot or better, particularly for ground water flow direction measurements. Liquid level sensor lengths of up to 300 to 500 feet for deep well applications may be provided by the very light-weight, highly flexible thin tape sensors of the invention that can be tightly wound in reels and fed from the reels into the wells and cut to form long customized lengths.

BRIEF DESCRIPTION OF THE DRAWINGS

FIGS. 1-5 disclose various exemplary patterns that are printed upon the elongated substrate portions that will be facing each other when assembled.

FIGS. 6-8 illustrate three components to be sandwiched and bonded together to form the assembled sensor of the currently most preferred embodiment of the invention, shown in FIG. 9.

DETAILED DESCRIPTION OF PREFERRED EMBODIMENTS OF THE INVENTION

As disclosed in my copending patent application Ser. No. 11/121,194, filed May 3, 2005, a liquid level tape sensor can comprise a flexible elongated resistive layer having an array of series connected resistors thereon that is spaced from and coupled to a second conductive layer. Hydrostatic fluid induced pressure will cause a portion of the flexible resistive layer to be bowed and make electrical contact with the conductive layer. By coupling an ohmmeter across the layers, the total resistance of the resistive string is measured, and the measured resistance is proportional to the location of the liquid level, and can be measured without raising the tape out of the vessel or well containing the sensor.

The reference to "printable resistive ink" as used herein in the specification and claims means an electrically conductive ink, typically metallic silver, that can be employed to produce a resistive network by printing patterns of thin layers of wide or narrow lines, or by printing convoluted lines in, for example, a zig-zag pattern. The reference to "highly flexible" substrates, as used in this description, means a substrate that can be wound up, if desired, into a roll having at least several turns. The zig-zag metallic ink pattern is useful in producing, for example, a convoluted pattern to provide sufficient resistance for an automobile fuel tank liquid level sensor of about 100-300 ohms.

Figure 10:
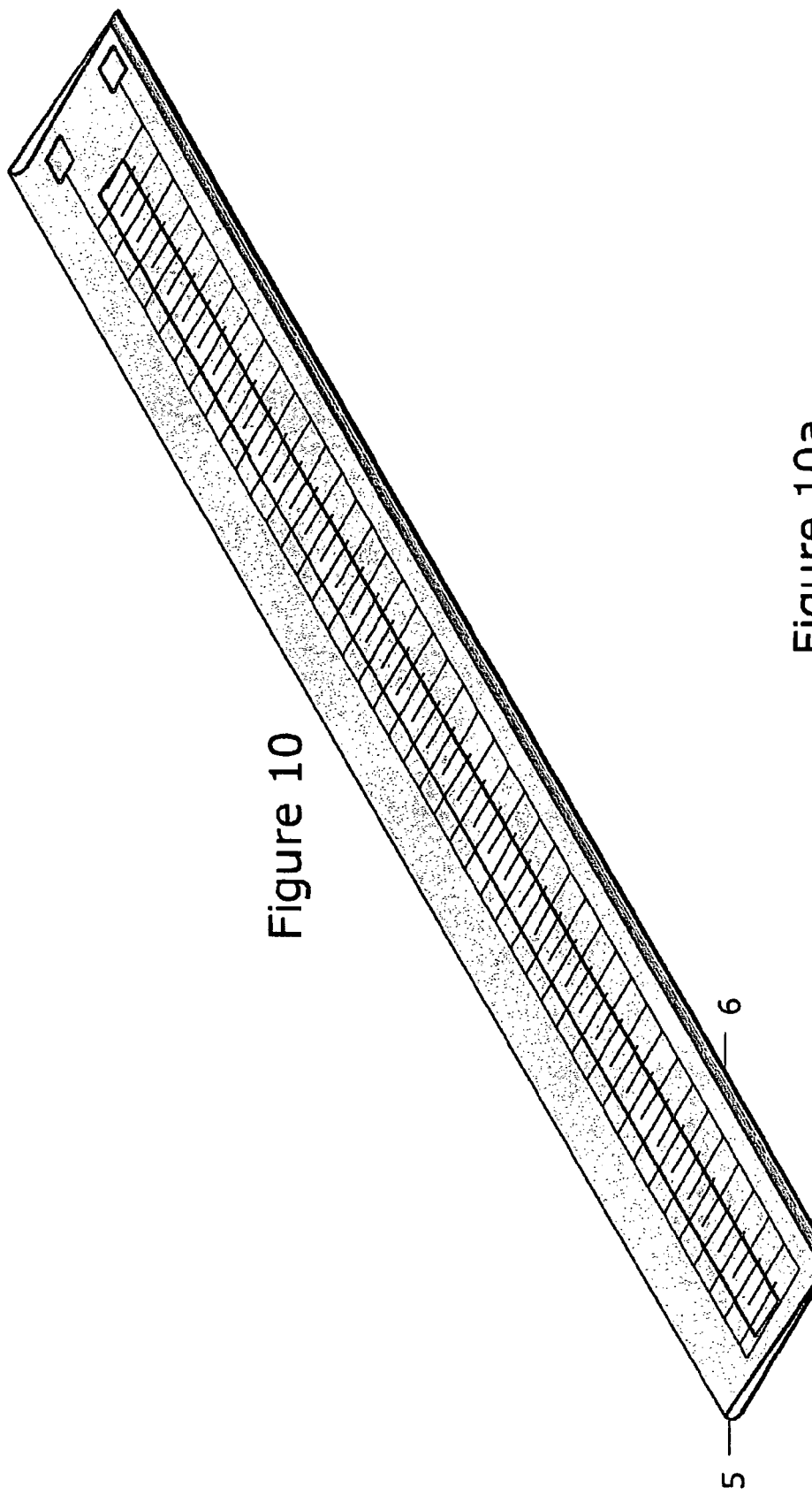
FIG. 10, illustrates a cross section of a first embodiment of the assembled sensor when the plastic strip is folded along the centerline 4, to produce right hand longitudinal edges 5 can be adhesively sealed to each other as shown, and the left hand longitudinal edge portions that are inherently coupled together by the resulting fold 6.
Figure 10A:

FIGS. 1-5 show rectangular printable resistive ink pattern 3a through 3g printed on a right hand portion and a left hand portion of a strip of plastic 1. In accordance with a one technique, the strips can be folded along fold line 4 so that the resistive patterns face each other and the resulting right hand edges 5 can be coupled together by an appropriate adhesive such as, for example a heat seal, as shown in FIG. 10. The left hand edges 6 are inherently coupled together by the fold without the need to employ an adhesive agent. The resulting product is placed in a well such as a gasoline tank of a vehicle and an ohmmeter 2 is connected across the facing resistive ink patterns or conductors as shown in FIG. 1. Since the plastic strips are preferably flexible, they can be conveniently mounted on the side of an irregularly shaped gasoline tank. If a greater total resistance is desired, the left hand printed ink pattern can be a thinner line 3c as shown in FIG. 2. An even greater total resistance can be produced by printing convoluted patterns such as zig-zag patterns 3d and 3e as shown in FIGS. 3 and 4. The FIG. 3 embodiment is suitable for measuring the level of gasoline in the tank of a vehicle. The FIG. 5 embodiment can produce very accurate level measurements by employing the left hand pattern 3g of FIG. 5.

It is seen that the 3g left hand embodiment of FIG. 5 is of a ladder design having interleaved resistive strips like the steps of a ladder for producing very accurate liquid level measurements.

The thickness and resiliency of the plastic strip along the left hand edge portion 6 of FIG. 10 are such as to maintain the patterns separated in the absence of hydrostatic pressure and to cause the patterns to contact each other in the presence of hydrostatic pressure. This can easily be determined by routine experimentation with laminated plastic sheets such as those for making conventional plastic ID cards typically by heat sealing. For example, various heat and pressure laminated products can be employed such as those employing ID cards and presentation folders that are made of plastic composite sheets of a first layer of polyester (polyethylene terepthalate) sold under the trademark "Mylar" that is coated with a second layer of heat activatable polyethylene.

In accordance with a presently most preferred second technique that involved separating rather than folding the left and right hand sections along the dotted lines 4 of FIGS. 1-5, prototypes were constructed and tested by the inventor. The services of two U.S. companies (Cabot Corp. and Parelec, Inc.) were enlisted to print two prototypes involving the ladder design 3g at the left hand section of FIG. 5 and as shown in FIG. 6. Cabot corp. printed the first prototype using silver conductive ink, inkjet printed onto 1 mil Kapton plastic (a polyimide manufactured by Dupont) to create the first and second printed patterns of FIGS. 6 and 8 of the facing sensor pairs. Parelec Inc, printed similar sensor pairs, also using silver conductive ink, screen printed onto 1 mil PET plastic to create the FIGS. 6 and 8 of the sensor pair. Cabot corp. printed multiple sensors pairs on 4×11 sheets of Kapton plastic. Parelec corp. printed multiple sensor pairs on 8.5×11 sheets of PET.

The printed sensors of FIGS. 6-9 were roughly 1 inch wide by 11 inches long and had an active range of resistance change operation of 10 inches. The Cabot prototype was designed to give an output of approximately 0 ohms when the container was full of liquid and 30 ohms when empty, over the 10 inch liquid level range of operation. The Parelec prototype was designed to give an output of approximately 0 ohms when full and 100 ohms when empty over the 10 inch range of operation. The resistive output was modified from 30 ohms in the Cabot prototype sensor to 100 ohms in the Parelec prototype sensor by varying the line widths of the ladder design, the thinner the line, the higher the measured resistance.

Several sensors were assembled using a spacing sheet 8 of FIG. 7 between the sensor pairs of FIGS. 6 and 8 to form a sandwich. Unprinted sections of 1 mil Kapton plastic and 1 mil PET plastic were used as the spacing means. An elongated window 9 shown in FIG. 7 was cut out of the spacer sheet 8 to allow contact between the sensor pair of FIGS. 6 and 8. The width of the window was varied until the appropriate sensitivity to liquid level changes was achieved. The resulting sandwich was assembled by applying several different adhesives (contact cement, gorilla glue, spray adhesive) to both sides of the spacer sheet The spacer was then applied to one side of the sensor pair then the other. In one assembly, the spacer was replaced with a 1 mil heat activated bonding film which was assembled using a hot iron. In another assembly, the sensor pair was not separated but was folded along the fold line 4 as described in the first technique hereinabove, and was sealed at the perimeter with the adhesives discussed above without the use of a spacer as shown in FIG. 1a The radius of the fold functioned as the spacing means in this instance.

Once assembled the sensors were submerged in water and tested using modified alligator clips to make electrical contact at the top of the sensor and an ohmmeter. The sensors were lowered and raised out of a water column while the ohmmeter was observed. The resistance as observed on the ohmmeter varied from approximately 0 to 30 (Cabot sensor) and 0 to 100 (Parelec sensor) as the sensors were lowered into and out of the water column, thus providing proof of concept To sumnmarize: an important beneficial result is to be able to take advantage of the high degree of flexibility of the low cost sensors of the invention to enable the flexible sensors to be placed anywhere in any orientation in an irregularly shaped fuel tank and yet produce accurate readings of the amount of fuel in the tank by using a lookup table. The use of a lookup table for measuring liquid levels is known in the art; see for example U.S. Pat. No. 6,262,953 to Benjey who states:

"The reserve volume of liquid fuel is then found for the computed height from a lookup table of values of liquid height and corresponding liquid volume."

Milone U.S. Pat. No. 6,829,928 discloses discrete hydrostatic probes of limited length that are joined together with other probes by one, two five and ten-foot modular sections as stated in column three. The modular sections can be connected together using various lengths to obtain the desired well depths which can vary considerably. This is in sharp contrast with the sensors of the present invention that can be fed from very long rolls, to substantial depths, due to their light-weight and high flexibility.

The sensors described herein may be contrasted with U.S. Pat. No. 4,890,492 to Andrejasich et al, who discloses in FIG. 4 a hydrostatic sensor having a resistive layer having a thickness of six mils (thousandths of an inch) separated from a conductive layer having a thickness of six mils. Spacers having a thickness of sixteen mils separate these two elements from each other. The resistive element is carbon screened upon a first plastic film strip while the conductive layer is sputtered upon a second plastic film strip. The resulting sandwich is employed as a discrete hydrostatic sensor probe. The resulting sensor is too thick to be highly flexible for applicant's preferred embodiments and beneficial results, previously described, and is more costly to produce than applicant's sensors.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the appended claims. For example the coupling means could include thin windowless strips or thick adhesive layers affixed to the longitudinal edges of the facing elongated substrates.

I claim:

1. A liquid level sensor comprising:
   (a) a first highly flexible elongated, insulated substrate having a first continuous pattern of a thin film liquid level sensor section thereon along the length of said substrate, said first continuous pattern comprising a printable resistive ink having a given resistivity printed upon said insulated substrate;
   (b) a second highly flexible elongated, insulated substrate having a second continuous pattern of thin film liquid level sensor sections thereon along the length of said substrate, said second continuous pattern comprising a printable resistive ink having a given resistivity printed upon said insulated substrate; and
   (c) coupling means for coupling said first and second insulated substrates together face to face for providing separation of said insulated substrates in the absence of hydrostatic pressure thereon, and for causing contact between said first and second insulated substrates in the presence of hydrostatic pressure thereon.

2. The sensor of claim 1 wherein the resistivity of the printable resistive ink printed upon said first insulated substrate is equal to the resistivity of the resistive ink printed upon said second insulated substrate, thereby to save manufacturing costs by enabling printing of said patterns upon said first and second insulated substrates with the same resistive ink.

3. The sensor of claim 1 wherein said coupling means comprises elongated folded over edge portions along a left hand length of said substrate and sealed edges along a right hand length of said substrate.

4. The sensor of claim 2 wherein said coupling means comprises elongated folded over edge portions along a left hand length of said substrate and sealed edges along a right hand length of said substrate.

5. The sensor of claim 1 wherein said coupling means comprises a sheet member having a window therein positioned between said first and second insulated substrates.

6. The sensor of claim 2 wherein said coupling means comprises a sheet member having a window therein positioned between said first and second insulated substrates.

7. The sensor of claim 1 wherein said printable resistive ink is printed upon said insulated substrates in the form of at least one convoluted pattern, thereby to increase the resistance of the pattern per unit of its length.

8. The sensor of claim 1 wherein said continuous pattern is selected from the group consisting of thin line patterns, zigzag patterns, and convoluted patterns.

9. The sensor of claim 1 wherein said printable resistive ink is a silver conductive ink.

10. The sensor of claim 1 wherein at least one of said continuous patterns is of a ladder design having interleaved resistive strips like the steps of a ladder, for producing very accurate liquid level measurements.

11. A liquid level sensor comprising:
   (a) a first elongated highly flexible insulated substrate, that can be wound up into a roll of at least several turns, having a continuous pattern of thin film liquid level sensor sections thereon along the length of said substrate, said continuous pattern comprising a printable resistive ink having a given resistivity printed upon said highly flexible insulated substrate;
   (b) a second elongated highly flexible insulated substrate, that can be wound up into a roll of at least several turns, having a continuous pattern of thin film liquid level sensor sections thereon along the length of said substrate, each pattern comprising a printable resistive ink having a given resistivity printed upon said highly flexible insulated substrate; and
   (c) coupling means for coupling said first and second insulated substrates together face to face while providing separation of said highly flexible insulated substrates in the absence of hydrostatic pressure thereon, and for causing contact between said first and second highly flexible insulated substrates in the presence of hydrostatic pressure thereon.

12. The sensor of claim 11 wherein the resistivity of the printable resistive ink printed upon said first insulated substrate is equal to the resistivity of the electrically conductive resistive ink printed upon said second insulated substrate, thereby to save manufacturing costs by enabling simultaneous printing of said patterns upon said first and second insulated substrates with the same resistive ink.

13. The sensor of claim 11 wherein said coupling means comprises elongated folded over edge portions along a left hand length of said substrate and sealed edges along a right hand length of said substrate.

14. The sensor of claim 12 wherein said coupling means comprises elongated folded over edge portions along a left hand length of said substrate and sealed edges along a right hand length of said substrate.

15. The sensor of claim 11 wherein said coupling means comprises a sheet member having an elongated window therein positioned between said first and second insulated substrates.

16. The sensor of claim 12 wherein said coupling means comprises a sheet member having an elongated window therein positioned between said first and second insulated substrates.

17. The sensor of claim 11 that is wound into a roll of at least several turns, thereby enabling cutting of the roll into liquid level sections of varying lengths from said roll to form customized lengths of liquid level sensors.

18. The sensor of claim 12 that is wound into a roll of at least several turns, thereby enabling cutting of the roll into liquid level sections of varying lengths from said roll to form customized lengths of liquid level sensors.

19. The sensor of claim 11 wherein said printable resistive ink is printed upon said insulated substrates in the form of at least one convoluted pattern, thereby to increase the resistance of the pattern per unit of its length.

20. The sensor of claim 11 wherein said continuous pattern is selected from the group consisting of thin line patterns, zig-zag patterns, and convoluted patterns.

21. The sensor of claim 11 wherein said printable resistive ink is a silver conductive ink.

22. The sensor of claim 11 wherein at least one of said continuous patterns is of a ladder design having interleaved resistive strips like the steps of a ladder for producing very accurate liquid level measurements.

* * * * *